(12) United States Patent
Liu et al.

(10) Patent No.: US 12,737,089 B2
(45) Date of Patent: Sep. 15, 2026

(54) SYSTEM AND METHOD FOR MULTI-WAVEFORM DRIVING FOR TOUCH SENSING

(71) Applicant: Synaptics Incorporated, San Jose, CA (US)

(72) Inventors: Chunbo Liu, San Jose, CA (US); Mulka R. Reddy, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 18/970,150

(22) Filed: Dec. 5, 2024

(65) Prior Publication Data

US 2026/0161254 A1 Jun. 11, 2026

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/04164* (2019.05)

(58) Field of Classification Search
CPC ..................................................... G06F 3/0446
USPC ......................................................... 345/173
See application file for complete search history.

(56) References Cited

U.S. PATENT DOCUMENTS 11,662,867 B1 * 5/2023 Krah ..................... G06F 3/0446 345/174
2012/0256870 A1 10/2012 Klein et al.
2014/0132559 A1 5/2014 Kim
2014/0192011 A1 7/2014 Min
2017/0108987 A1 4/2017 Park et al.
2018/0062508 A1 3/2018 Yao et al.
2020/0089354 A1 * 3/2020 Gray ................... G06F 3/04886
2024/0211078 A1 * 6/2024 Kim .................... G06F 3/04184
2025/0077028 A1 * 3/2025 Kang ................. G06F 3/04186

OTHER PUBLICATIONS

International Search Report and Written Opinion of the International Search Authority, Mar. 27, 2026.

* cited by examiner

*Primary Examiner* — Long D Pham
(74) *Attorney, Agent, or Firm* — Leydig, Voit & Mayer, Ltd.

(57) ABSTRACT

A system and method for transmitting signals using an input device is provided. The input device comprises a display and a touch sensor. The touch sensor has a plurality of sensor electrodes and a sensor circuit. The plurality of sensor electrodes are configured to transmit a periodic signal corresponding to a first waveform and a second waveform. The sensor circuit has a first charge pump configured to generate the first waveform to drive a first set of sensor electrodes of the plurality of sensor electrodes, and a second charge pump to configured generate the second waveform to drive a second set of sensor electrodes, different from the first set of sensor electrodes.

20 Claims, 6 Drawing Sheets

SYSTEM AND METHOD FOR MULTI-WAVEFORM DRIVING FOR TOUCH SENSING

TECHNICAL FIELD

This disclosure generally relates to touch sensors.

BACKGROUND

Input devices such as touch sensor devices (also commonly called touchpads, touch sensors, or proximity sensor devices), are used in a variety of electronic systems. Touch sensor devices typically include a sensing region, often demarked by a surface, in which the touch sensor device determines the presence, location and/or motion of one or more input objects, typically for purposes of allowing a user to provide user input to interact with the electronic system. The input device may be a touchscreen that includes a plurality of electrodes and is also capable of allowing the user to provide user input to interact with the electronic system. In recent years, foldable devices having touch-screens or other types of capacitive sensors have been developed. Touch sensors may be integrated in a display such as, for example, commonly found in mobile phones, laptops and similar devices.

There is a need in the field to enhance the performance of touch sensor devices in order to improve the user experience.

SUMMARY

In an exemplary embodiment, a touch sensor is provided. The touch sensor has a plurality of sensor electrodes and a sensor circuit. The plurality of sensor electrodes are configured to transmit a periodic signal corresponding to a first waveform and a second waveform. The sensor circuit includes a first charge pump configured to generate the first waveform to drive a first set of sensor electrodes of the plurality of sensor electrodes; and a second charge pump configured to generate the second waveform to drive a second set of sensor electrodes of the plurality of sensor electrodes, wherein the second set of sensor electrodes are different from the first set of sensor electrodes.

In a further exemplary embodiment, an input device is provided. The input device comprises a display and a touch sensor. The touch sensor has a plurality of sensor electrodes and a sensor circuit. The plurality of sensor electrodes are configured to transmit a periodic signal corresponding to a first waveform and a second waveform. The sensor circuit includes a first charge pump configured to generate the first waveform to drive a first set of sensor electrodes of the plurality of sensor electrodes; and a second charge pump configured to generate the second waveform to drive a second set of sensor electrodes of the plurality of sensor electrodes, wherein the second set of sensor electrodes are different from the first set of sensor electrodes.

In a yet a further exemplary embodiment, a method for transmitting a periodic signal is provided. The method includes driving a plurality of sensor electrodes based on a first waveform and a second waveform; generating, by a first charge pump, the first waveform to drive a first set of sensor electrodes of the plurality of sensor electrodes; and generating, by a second charge pump, the second waveform to drive a second set of sensor electrodes of the plurality of sensor electrodes, wherein the second set of sensor electrodes are different from the first set of sensor electrodes.

DESCRIPTION

The following detailed description is exemplary in nature and is not intended to limit the disclosure or the application and uses of the methods and systems described herein. Furthermore, there is no intention to be bound by any expressed or implied theory presented in the preceding technical field, background, summary and brief description of the drawings, or the following detailed description.

Exemplary systems and methods discussed herein provide for enhanced signal transmission through touch sensing devices. In conventional approaches, when the full panel of the touch sensing device is configured to transmit a beacon signal (a periodic signal transmitted through sensor electrodes, which may be used, for example, with an active pen), it is driven by a waveform generated and supplied by a single charge pump. However, these approaches encounter challenges when the beacon signal requires a large voltage amplitude and high frequency, as the single charge pump may have difficulty charging the sensor electrodes to the predefined high/low state during the designated duration for the high/low state. According to exemplary embodiments, a touch sensing system and method use a plurality of charge pumps to drive different groups of sensor electrodes to transmit signals. The described methods and systems enhance the quality of high-frequency signals transmitted by the sensor electrodes and increase the overall capabilities of the touch sensing system and method, enabling more robust communication and better performance. Moreover, the enhanced signal quality also improves the signal-to-noise ratio (SNR), allowing, for example, an active pen to more effectively receive signals from the touch sensing system.

Figure 1:
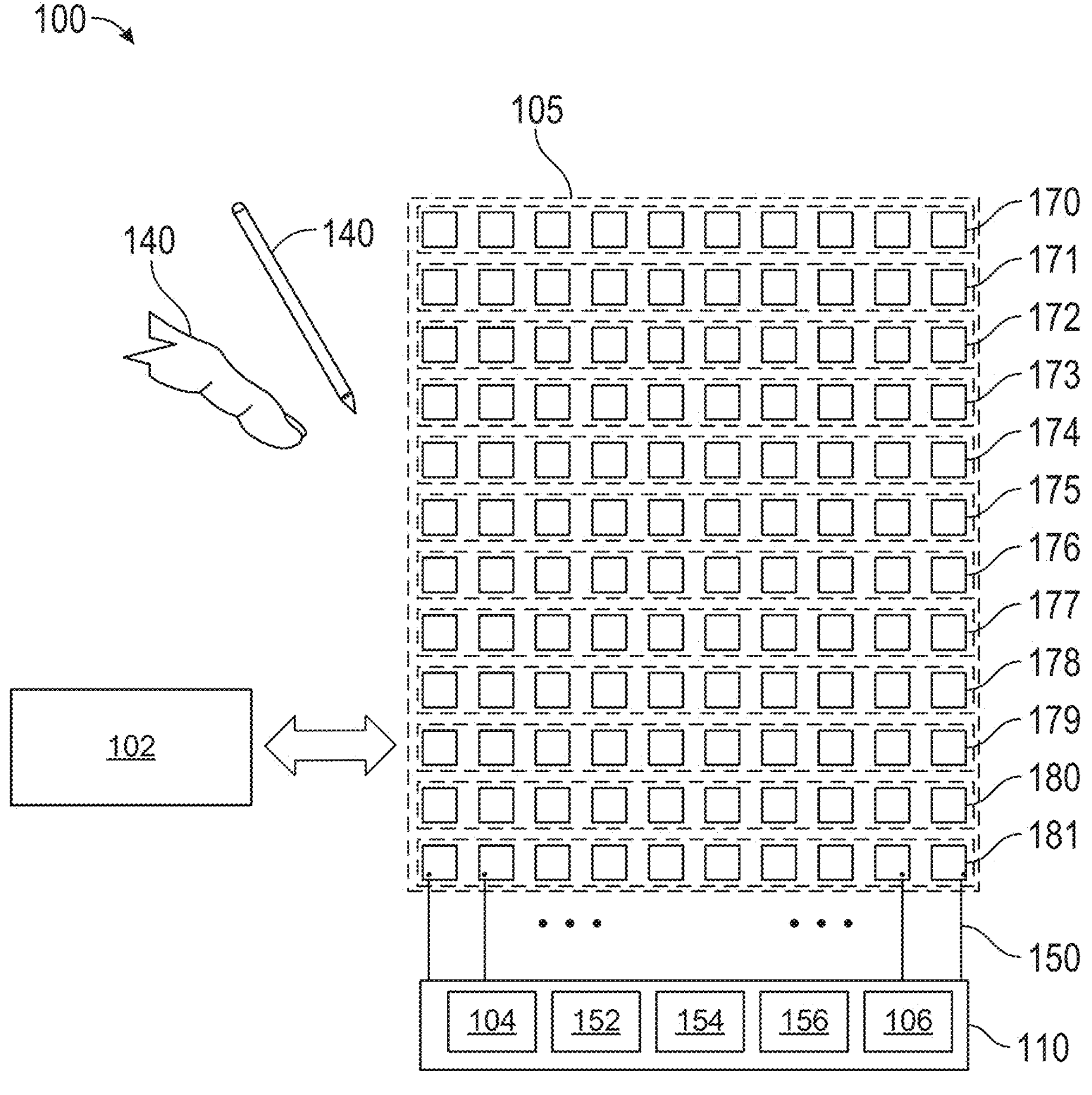
FIG. 1 is a block diagram of an input device, according to one or more embodiments.

FIG. 1 illustrates an input device 100 configured to provide input to an electronic system 102, which can be used to implement touch sensing in at least certain modes as described herein. Some non-limiting examples of electronic systems include desktop computers, laptop computers, netbook computers, tablets, terminals, kiosks, mobile (e.g., cellular) phones, automotive multimedia centers and internet of things (IoT) devices, among others. The input device 100 may be part of the electronic system 102 or may be a separate component communicatively coupled to the electronic system 102.

The input device 100 includes a processing system 110 and sensor electrodes 105. The processing system 110 operates the sensor electrodes 105 to detect one or more input objects 140 or other condition in a sensing area of the input device 100. Example input objects 140 include fingers, styli, and/or active pen as shown in FIG. 1. Input objects may include parts of a hand other than a finger, such as a palm or side of the hand.

The sensing area of the input device 100 encompasses any space above, around, in and/or near the input device 100 in which the input device 100 is able to detect user input, e.g., user input provided by one or more input objects 140. In certain embodiments, the input device 100 is able to detect other conditions, such as an angle at which a foldable device is open.

The sensor electrodes 105 are coupled to the processing system 110 via conductive paths, e.g., traces 150. An exemplary pattern of the sensor electrodes 105 illustrated in FIG. 1 comprises an array of sensor electrodes 105 disposed in a plurality of rows and columns. In one example, the sensor electrodes 105 are disposed in rows, e.g., rows 170-181. In other embodiments, the sensor electrodes may be disposed in columns. It is contemplated that the sensor electrodes 105 may be arranged in other patterns, such as polar arrays, repeating patterns, non-repeating patterns, non-uniform arrays, or other suitable arrangement. The sensor electrodes 105 may have any suitable shape, such as circular, rectangular, diamond, star, square, nonconvex, convex, nonconcave, concave, or other geometry.

The sensor electrodes 105 may be disposed in a common layer. For example, the sensor electrodes 105 may be disposed on a first side of a common substrate. In other embodiments, the sensor electrodes 105 may be disposed in two or more layers. For example, a portion of the sensor electrodes 105 may be disposed on a first layer and another portion of the sensor electrodes may be disposed on a second layer. The first and second layers may be disposed on different sides of a common substrate, or disposed on different substrates.

The sensor electrodes 105 may be comprised of a conductive material such as a metal mesh, indium tin oxide (ITO), or the like. Further, the sensor electrodes 105 are ohmically isolated from each other such that one or more insulators separate the sensor electrodes and prevent them from electrically shorting to each other.

The processing system 110 includes sensor circuitry 104. Further, the processing system 110 may include a determination circuit 106. The processing system 110 is configured to operate the sensor electrodes 105 to detect one or more input objects 140 or other condition in the sensing area of the input device 100. The processing system 110 fully or partially resides in one or more integrated circuit (IC) chips. For example, the processing system 110 may include a single IC chip. Alternatively, the processing system 110 may include multiple IC chips. The processing system may also include one or more discrete circuits.

The sensor circuitry 104 is coupled to the sensor electrodes 105 via the routing traces 150 and is configured to drive the sensor electrodes 105 with sensing signals to detect one or more input objects 140 in the sensing area of the input device 100. The sensor circuitry 104 may also be configured to drive the sensor electrodes 105 with other signals, such as guarding signals and/or ground signals.

The sensor circuitry 104 includes digital and/or analog circuitry. For example, the sensor circuitry 104 comprises transmitter (or driver) circuitry configured to drive or transmit sensing signals onto the sensor electrodes 105 and receiver circuitry to receive resulting signals from the sensor electrodes 105. The transmitter circuitry may include one or more amplifiers and/or one or more modulators configured to drive sensing signals on to the sensor electrodes 105.

The processing system 110 may include analog-to-digital and/or digital-to-analog converters (ADCs and/or DACs) 154, and analog front ends (AFEs) 152 comprising, for example, integrators configured to receive resulting signals from the sensor electrodes 105. The processing system 110 may include compensation circuitry 156 configured to provide signals to compensate for background capacitance. The ADCs (and/or DACs) 154, AFEs 152 and compensation circuitry 156 may be part of the sensor circuitry 104 or may form different circuits.

The processing system 110 may perform any appropriate amount of processing on the electrical signals to translate or generate the information provided to the electronic system. For example, the processing system 110 may digitize analog signals received via the sensor electrodes 105 and/or perform filtering or conditioning on the received signals. In some aspects, the processing system 110 may subtract or otherwise account for a "baseline" associated with the sensor electrodes 105. For example, the baseline may represent a state of the sensor electrodes 105 when no user input is detected. In certain embodiments, the baseline may be updated to reflect a touch in a certain area of the touch sensor and may be used to detect a condition such as a non-moving finger or other input object, e.g., a stable touch. The information provided by the processing system 110 to the electronic system may reflect a difference between the signals received from the sensor electrodes 105 and a baseline associated with each sensor electrode 105.

The sensor circuitry 104 may drive the sensor electrodes 105 in various modes. In some modes, the sensor circuitry 104 may utilize all sensor electrodes 105 to detect an input object. In other modes, the sensor circuitry 104 may only utilize a subset of the sensor electrodes 105 to detect an input object.

In certain embodiments or modes, the sensor circuitry 104 drives a first one or more of the sensor electrodes 105 with a transcapacitive sensing signal and receives a resulting signal with a second one or more of the sensor electrodes 105 to operate the sensor electrodes 105 for transcapacitive sensing. Operating the sensor electrodes 105 for transcapacitive sensing detects changes in capacitive coupling between sensor electrodes 105 driven with a transcapacitive sensing signal and sensor electrodes 105 operated as receiver electrodes. The capacitive coupling may be reduced when an input object (e.g., the input object 140) coupled to a system ground approaches the sensor electrodes 105. Driving the sensor electrodes 105 with transcapacitive sensing signals comprises modulating the sensor electrodes 105 relative to a reference voltage, e.g., system ground. Transcapacitive sensing may be used in connection with a parallel touch sensing mode. However, it will be understood that transcapactive sensing is not limited to parallel touch sensing modes. For example, transcapacitive sensing may include driving rows of the sensor electrodes 105 with a transcapacitive sensing signal and reading columns of the sensor electrodes 105 to obtain resulting signals and/or vice versa.

The transcapacitive sensing signal is a periodic or aperiodic signal that varies between two or more voltages. Further, the transcapacitive sensing signal typically has a frequency between 50 kHz and 1 MHz, but in other embodiments other frequencies may be utilized. The transcapacitive sensing signal may have a peak-to-peak amplitude in a range of about 1 V to about 10 V. However, in other embodiments, the transcapacitive sensing signal may have a peak-to-peak amplitude greater than about 10 V or less than about 1 V. Additionally, the transcapacitive sensing signal may have a square waveform, a sinusoidal waveform, triangular waveform, a trapezoidal waveform, or a sawtooth waveform, among others.

In some embodiments, operating the sensor electrodes 105 to receive resulting signals comprises holding the sensor electrodes 105 at a substantially constant voltage or modulating the sensor electrodes 105 relative to the transcapacitive sensing signal. A resulting signal includes effect(s) corresponding to one or more transcapacitive sensing signals, and/or to one or more sources of environmental interference, e.g., other electromagnetic signals.

In other embodiments or modes, the sensor circuitry 104 operates the sensor electrodes 105 for absolute capacitive sensing by driving a first one or more of the sensor electrodes 105 with an absolute capacitive sensing signal and receiving a resulting signal with the driven sensor electrodes 105. Operating the sensor electrodes 105 for absolute capacitive sensing detects changes in capacitive coupling between sensor electrodes 105 driven with an absolute capacitive sensing signal and an input object (e.g., the input object 140). The capacitive coupling of the sensor electrodes 105 driven with the absolute capacitive sensing signal is altered when an input object (e.g., the input object 140) coupled to a system ground approaches the sensor electrodes 105.

The absolute capacitive sensing signal is a periodic or aperiodic signal that varies between two or more voltages. Further, the absolute capacitive sensing signal typically has a frequency between about 50 kHz and about 1 MHz, but in other embodiments, other frequencies may be utilized. Additionally, the absolute capacitive sensing signal may have a square waveform, a sinusoidal waveform, triangular waveform, a trapezoidal waveform, or a sawtooth waveform, among others. The absolute capacitive sensing signal may have a peak-to-peak amplitude in a range of about 1 V to about 10 V. However, in other embodiments, the absolute capacitive sensing signal may have a peak-to-peak amplitude greater than about 10 V or less than about 1 V. In various embodiments, driving the sensor electrodes 105 with an absolute capacitive sensing signal comprises modulating the sensor electrodes 105. A resulting signal received while performing absolute capacitive sensing may comprise effect(s) corresponding to one or more absolute capacitive sensing signals, and/or to one or more sources of environmental interference, e.g., other electromagnetic signals. The absolute capacitive sensing signal may be the same or different from the transcapacitive sensing signal used in transcapacitance sensing.

In certain embodiments, the sensor circuitry 104 drives a subset of the sensor electrodes 105 with a guard signal. A sensor electrode 105 driven with a guard signal may be referred to as a guarded sensor electrode or guard electrode. Driving a sensor electrode 105 with a guard signal mitigates a voltage difference between the guarded sensor electrode and a sensor electrode driven with the absolute capacitive sensing signal in parallel. Driving the guard signal onto a first one or more sensor electrodes 105 while driving the sensing signal onto a second one or more sensor electrodes 105 results in little or no change in capacitance between the guarded sensor electrode(s) and the sensor electrode(s) driven with the absolute capacitive sensing signal.

It will be appreciated that the sensor circuitry 104 may drive the sensor electrodes 105 in multiple modes. For example, the sensor circuitry 104 may drive the sensor electrodes 105 in a transcapactive mode during a first time period and an absolute capacitive mode during a second time period. Further, the sensor circuitry 104 may drive the sensor electrodes 105 with multiple versions of a particular mode. For example, the sensor circuitry 104 may drive the sensor electrodes 105 in parallel transcapactive sensing mode during a first period of time and a non-parallel transcapacitive sensing mode during a second period of time. Non-parallel transcapacitive sensing, for example, involves driving either rows or columns with a transcapacitive sensing signal and reading resulting signals from the other of the rows or columns as previously described. Parallel transcapacitive sensing involves both driving and reading electrodes having generally the same orientation (e.g., non-overlapping).

The determination circuit 106 receives the resulting signals from the sensor circuitry 104 and processes the resulting signals to determine changes in capacitive coupling of the sensor electrodes 105. The determination circuit 106 utilizes the changes in capacitive coupling of the sensor electrodes 105 to determine positional information of one or more input objects (e.g., the input object 140) or to determine a change in capacitance for other reason. The determination circuit 106 may perform other functions, such as, for example, measuring the amount of noise present in one or more regions of a sensing area and/or determining whether positional information has been corrupted or degraded by noise. In certain embodiments, the determination circuit 106 may combine resulting signals.

In one or more embodiments, measurements of the changes in capacitive coupling determined from the resulting signals received from the sensor electrodes 105 may be utilized by the determination circuit 106 to form a capacitive image. The resulting signals utilized to detect the changes in capacitive coupling are received during a capacitive frame. A capacitive frame may correspond to one or more capacitive images. Multiple capacitive images may be acquired over multiple time periods, and differences between the images used to derive information about an input object 140 in the sensing area of the input device 100. For example, successive capacitive images acquired over successive periods of time can be used to track the motion(s) of one or more input objects entering, exiting, and within the sensing area.

"Positional information" as used herein broadly encompasses absolute position, relative position, velocity, acceleration, and other types of spatial information in zero, one, two or three dimensions as appropriate. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Figure 2:
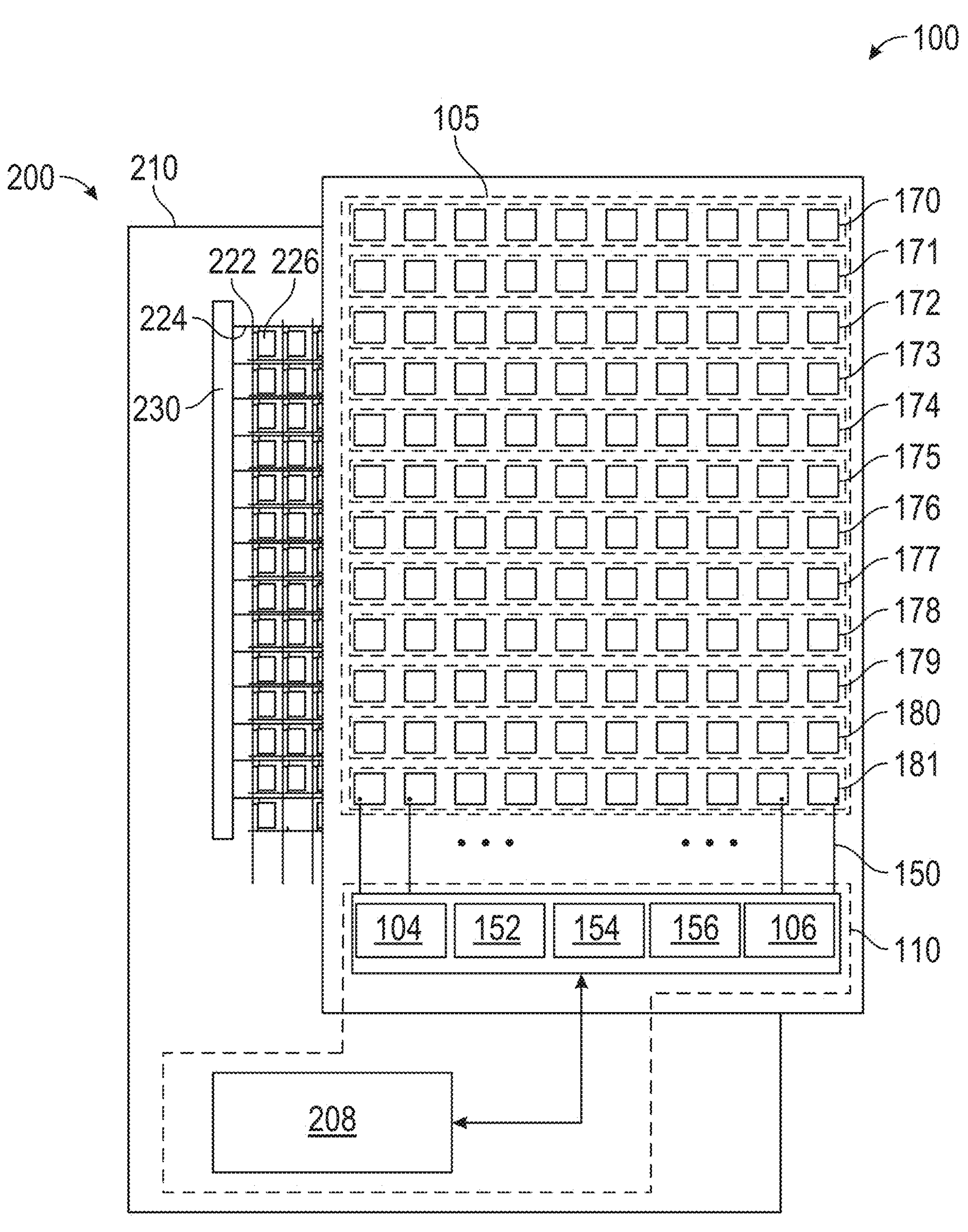
FIG. 2 is a block diagram of an input device with integrated display, according to one or more embodiments.

FIG. 2 illustrates an example of the input device 100 wherein the input device is shown overlapped and/or integrated with a display of a display device 200. The display of the display device 200 may be any suitable type of display such as, for example, light emitting diode (LED), microLED, organic LED (OLED), microOLED, liquid crystal display (LCD), plasma, electroluminescence (EL), or other display technology.

The display device 200 includes a display panel 210 communicatively coupled with a display driver 208 and gate selection circuitry 230. The display panel 210 includes display electrodes that are driven to update subpixel electrodes 226 of the display panel 210. The display electrodes include data lines 222 and gate lines 224, among others. The display driver 208 may be part of the processing system 110 (FIG. 1) or may be a separate component.

The data lines 222 are coupled to the display driver 208 and the gate lines 224 are coupled to the gate selection circuitry 230. Each of the subpixel electrodes 226 is coupled to one of the gate lines 224 and one of the data lines 222. The gate selection circuitry 230 is configured to drive gate select and gate deselect signals onto the gate lines 224 to select (activate) and deselect (deactivate) corresponding subpixels for updating.

The display driver 208 includes display driver circuitry configured to drive the data lines 222 with subpixel data signals to update the selected subpixels electrodes 226 and update the display of the display device 200. For example, the display driver 208 may drive display update signals onto the data lines 222 during corresponding display updating periods.

The display driver 208 is configured to update the subpixel electrodes 226 to update an image displayed on the display panel 210 during display frames. The display frames may be updated, or refreshed, once about every 16 ms, generating a display refresh rate of about 60 Hz. In other embodiments, other display refresh rates may be employed. For example, the display refresh rate may be 90 Hz, 120 Hz, 140 Hz, or greater.

The display driver 208, the sensor circuitry 104, the determination circuit 106, the AFEs 152, the ADCs (and/or DACs) 154, and the compensation circuitry 156 may be part of a common processing system (e.g., the processing system 110 forms a touch and display controller). Alternatively, the display driver 208 may be part of a first processing system and the sensor circuitry 104, AFEs 152, the ADCs (and/or DACs) 154, the compensation circuitry 156, and the determination circuit 106 may be part of a second processing system. Further, the display driver 208, the sensor circuitry 104, the AFEs 152, the ADCs (and/or DACs) 154, the compensation circuitry 156, and the determination circuit 106 may be part of a common IC chip. Alternatively, one or more of these components may be disposed in a first IC chip and a second one or more of these components may be disposed on a second IC chip, etc. As an alternative, any of the sensor circuitry 104, AFEs 152, the ADCs (and/or DACs) 154, the compensation circuitry 156, and/or the determination circuit 106 may be implemented in whole or in part by one or more discrete circuits.

In various embodiments, the sensor circuitry 104 is configured to drive the sensor electrodes 105 for capacitive sensing during a capacitive frame at a capacitive frame rate. Further, each capacitive frame may include multiple periods during which different sensor electrodes 105 are operated for capacitive sensing.

The "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or multiple of the display frame rate. Further, the capacitive frame rate may be a rational fraction of the display rate (e.g., 1/2, 2/3, 1, 3/2, 2). In one or more embodiments, the display frame rate may change while the capacitive frame rate remains constant. In other embodiments, the display frame rate may remain constant while the capacitive frame rate is increased or decreased. Alternately, the capacitive frame rate may be unsynchronized from the display refresh rate or the capacitive frame rate may be a non-rational fraction of the display rate to minimize interference "beat frequencies" between the display updating and the input sensing.

In one or more embodiments, capacitive sensing (or input sensing) and display updating may occur during at least partially overlapping periods. For example, the sensor circuitry 104 is configured to operate the sensor electrodes 105 for capacitive sensing while the display driver 208 operates the gate lines 224 and data lines 222 to update an image displayed by the display panel 210. For example, updating the display panel 210 and operating the sensor electrodes 105 for capacitive sensing may be asynchronous with each other. Further, updating the display panel 210 and operating the sensor electrodes 105 for capacitive sensing may or may not be synchronized with each other.

In one or more embodiments, updating the display panel 210 and operating the sensor electrodes 105 for capacitive sensing may occur during non-overlapping periods. For example, updating the display panel 210 may occur during display update periods and operating the sensor electrodes 105 for capacitive sensing may occur during non-display update periods. The non-display update periods may be a blanking period that occurs between the last line of a display frame and the first line of the following display frame (e.g., during a vertical blanking period). Further, the non-display update periods may occur between display line update periods for two consecutive display lines of a display frame and are at least as long in time as the display line update period. In such embodiments, the non-display update period may be referred to as a long horizontal blanking period or long h-blanking period, where the blanking period occurs between two display line updating periods within a display frame and is at least as long as a display line update period.

In one or more embodiments, the sensor circuitry 104 may generate a periodic waveform to drive the sensor electrodes 105 in various modes. The periodic waveform may, for example, be predefined as a square wave (or other periodic or non-periodic waveform) with reference signals (e.g., voltage signals) oscillating between reference values (e.g., voltage supplies). For example, in a mutual capacitance (trans-capacitance) sensing mode, the sensor circuitry 104 may provide a waveform that oscillates between voltage values of −3V and 6V, with a frequency ranging from 100 kilohertz (kHz) and 200 kHz, to drive one axis of the panel (e.g., all the rows or columns of sensor electrodes 105, resulting in approximately half the full panel capacitance).

In one or more embodiments, the sensor circuitry 104 may drive the sensor electrodes 105 to generate beacon signals, which are periodic reference signals (e.g., voltage reference signals) used to establish communication, synchronize devices, or provide a stable reference for detecting proximity or position. For example, in active pen applications, the processing system 110 may control the sensor circuitry 104 to generate a periodic waveform to drive the sensor electrodes 105 and send periodic beacon signals to a pen (e.g., a styli). In some examples, the sensor circuitry 104 may drive the entire panel (e.g., all rows and columns) of the sensor electrodes 105 with a code sequence (e.g., a waveform) at a frequency (e.g., 1 MHz or a period of one microsecond (1 μs)), corresponding to the clock period provided by an integrated circuit (e.g., a chip). This introduces significantly higher driver loading compared to regular mutual capacitance sensing. In further examples, a high-voltage beacon with a voltage difference greater than 3V may be required for large detection distances. This can cause excessive loading for the charge pump circuits in the sensor circuitry 104.

Figure 3:
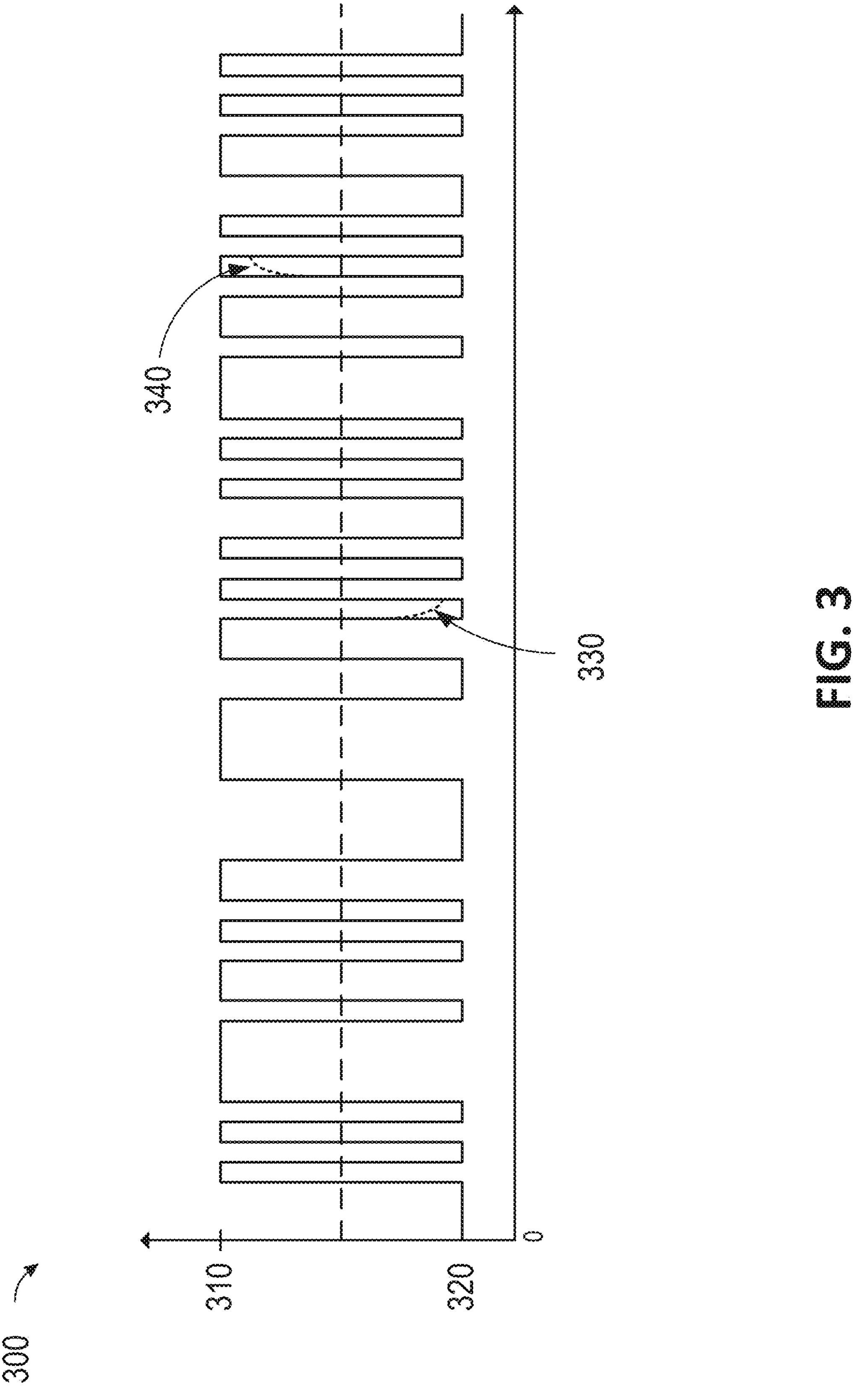
FIG. 3 illustrates an example of waveform, according to one or more embodiments.

FIG. 3 illustrates an example of waveform 300, according to one or more embodiments. In the example of FIG. 3, the sensor circuitry 104 may generate the waveform 300 to drive the sensor electrodes 105 in the input device 100. The waveform 300 is a square waveform that oscillates between a first reference value 310 and a second reference value 320, with varying pulse widths and periods. The first reference value 310 is referred to as a high state, and the second reference value 320 is referred to as a low state. In the waveform 300, the duration of each high and low state (pulse width) and the time between each full cycle (period) can change, allowing for flexible timing patterns across the signal.

Difficulties arise when the oscillation frequency is very high (e.g., around 1 MHz), and the required oscillation amplitude is large (e.g., a voltage difference of about 6V). For example, achieving a sufficiently rapid transition time can be challenging, which can lead to situations where the actual signal does not reach the preset reference value within a designated duration for the high or low state, such as the dashed ramping curves as indicated by arrows 330 and 340.

Figure 4A:
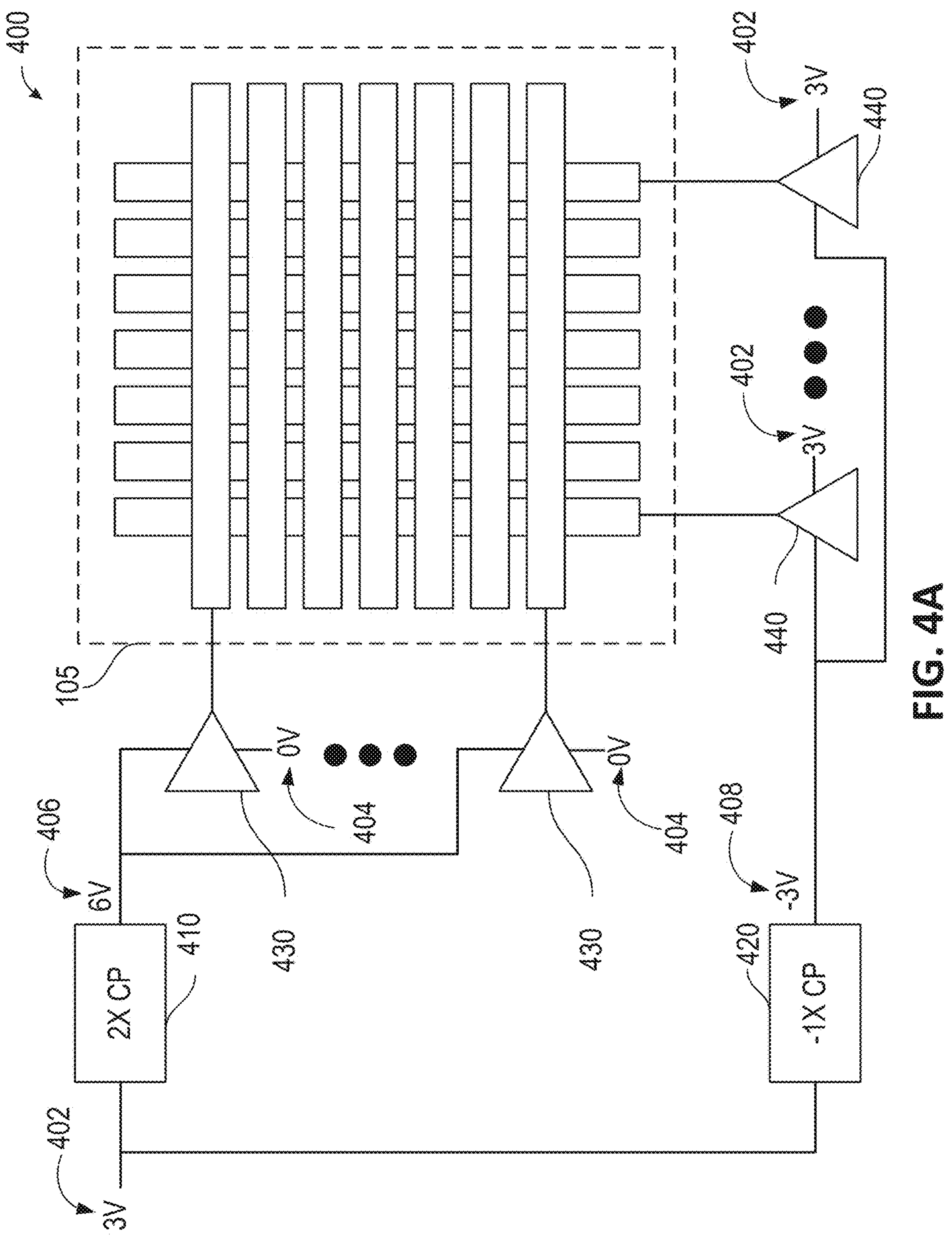
FIG. 4A illustrates charge pump circuitry configured to generate waveforms to drive sensor electrodes in an input device, according to one or more embodiments.

FIG. 4A illustrates charge pump circuitry 400 configured to generate waveforms to drive sensor electrodes 105 in an input device 100, according to one or more embodiments. The charge pump circuitry 400 is integrated into the processing system 110 of the input device 100 or may be a separate circuit. In one embodiment, the charge pump circuitry 400 is integrated in the sensor circuitry 104 of the processing system 110. For example, the charge pump circuitry 400 may be included in the transmitter circuitry in the sensor circuitry 104. However, it will be understood that the charge pump circuitry 400 may include other suitable components, such as switches, capacitors, resistors, etc.

Referring to FIG. 4A, the charge pump circuitry 400 includes a first charge pump (denoted as CP in FIG. 4A) 410 and a second charge pump 420. One end of each of the first charge pump 410 and the second charge pump 420 is connected to a reference voltage 402, which provides a reference voltage of 3V in this example. The first charge pump 410 is configured to double the reference voltage (denoted as "2×"), thereby outputting a 6V reference voltage 406. The second charge pump 420 is configured to invert the reference voltage (denoted as "−1"), thereby outputting a −3V reference voltage 408. In this example, the sensor electrodes 105 are arranged in rows and columns, with each row/column of the sensor electrodes 105 controlled by a driving signal. It will be appreciated that the particular voltages shown and described are by way of example, and not limitation.

The charge pump circuitry 400 further includes a plurality of transmitters (e.g., 430 and 440), each transmitter can be connected to one or more rows or columns of the sensor electrodes 105. This allows the waveform output from each transmitter to drive the respective row or column of the sensor electrodes 105. In one or more embodiments, a transmitter may include multiple components, such as an oscillator, a sequence generator, and a voltage buffer (e.g., an operational amplifier configured as a voltage follower). Each transmitter is connected to two voltage references. In this example, the transmitters 430 are connected to rows of the sensor electrodes 105, and the transmitters 440 are connected to columns of the sensor electrodes 105. Each transmitter 430 is connected to the 6V reference voltage 406 output from the first charge pump 410 and a zero-volt (0V) reference voltage 404 provided by ground. Each transmitter 440 is connected to the 3V reference voltage 402 and the −3V reference voltage 408 output from the second charge pump 420. It will again be appreciated that the particular voltages shown and described are by way of example, and not limitation.

While driving one or more sensor electrodes 105, a charge pump is configured to provide a driving current ($I_{CP}$) based on the reference voltage supplies, formulated as:

$$I_{CP} = C_{load} V_{tx} f_{tx}, \quad \text{(Eq. 1)}$$

where $C_{loud}$ is the total load capacitance of the sensor electrodes 105 driven by the charge pump, $V_{tx}$ is the transmitter (Tx) peak-to-peak voltage, and $f_{tx}$ is the frequency. The Tx peak-to-peak voltage ($V_{tx}$) is supplied by the output of the charge pump and decreases when a load current is drawn due to charge pump's output impedance ($R_{out}$), which is expressed as:

$$V_{tx} = 2V_{DD} - R_{out} I_{CP}, \quad \text{(Eq. 2)}$$

where $V_{DD}$ is a reference voltage supply provided to the circuitry (e.g., the 3V reference voltage 402), $2V_{DD}$ represents the doubled reference voltage that the first charge pump 410 is configured to supply (as its ideal output voltage under no load condition). Combining Equations 1 and 2 yields:

$$V_{tx} = \frac{2V_{DD}}{1 + R_{out} I_{CP} f_{tx}}. \quad \text{(Eq. 3)}$$

The frequency ($f_{tx}$) is predefined subject to various operation modes, $R_{out}$ is fixed unless being redesigned (e.g., by increasing the size of the charge pump). Given this, the charge pump circuitry 400 is configured to optimize the Tx peak-to-peak voltage ($V_{tx}$) by reducing the load capacitance ($C_{load}$).

In certain embodiments, the charge pump circuitry 400 drives all rows of the sensor electrodes 105 utilizing power supplied by the first charge pump 410. For example, the transmitters 430 connected to the rows of the sensor electrodes 105 generate waveforms that oscillate between the 6V reference voltage 406 and the 0V reference voltage 404. Additionally, the charge pump circuitry 400 drives all columns of the sensor electrodes 105 utilizing power supplied by the second charge pump 420. For example, the transmitters 440 connected to the columns of the sensor electrodes 105 generate waveforms that oscillate between the 3V reference voltage 402 and the −3V reference voltage 408. This way, the charge pump circuitry 400 drives the full panel (or entire) of the sensor electrodes 105, with each charge pump driving half of the panel and handling approximately half the total load capacitance of the sensor electrodes 105.

In certain embodiments, the charge pump circuitry 400 is configured to drive a subset of the sensor electrodes 105 utilizing power supplied by the first charge pump 410 and the second charge pump 420. The charge pump circuitry 400 may be configured to drive a first group of sensor electrodes 105 in the subset utilizing power supplied by the first charge pump 410, and to drive a second group of sensor electrodes 105 in the subset utilizing power supplied by the second charge pump 420. The first and second groups of sensor electrodes 105 may correspond to different sensor electrodes or different rows and/or columns of sensor electrodes.

Figure 4B:
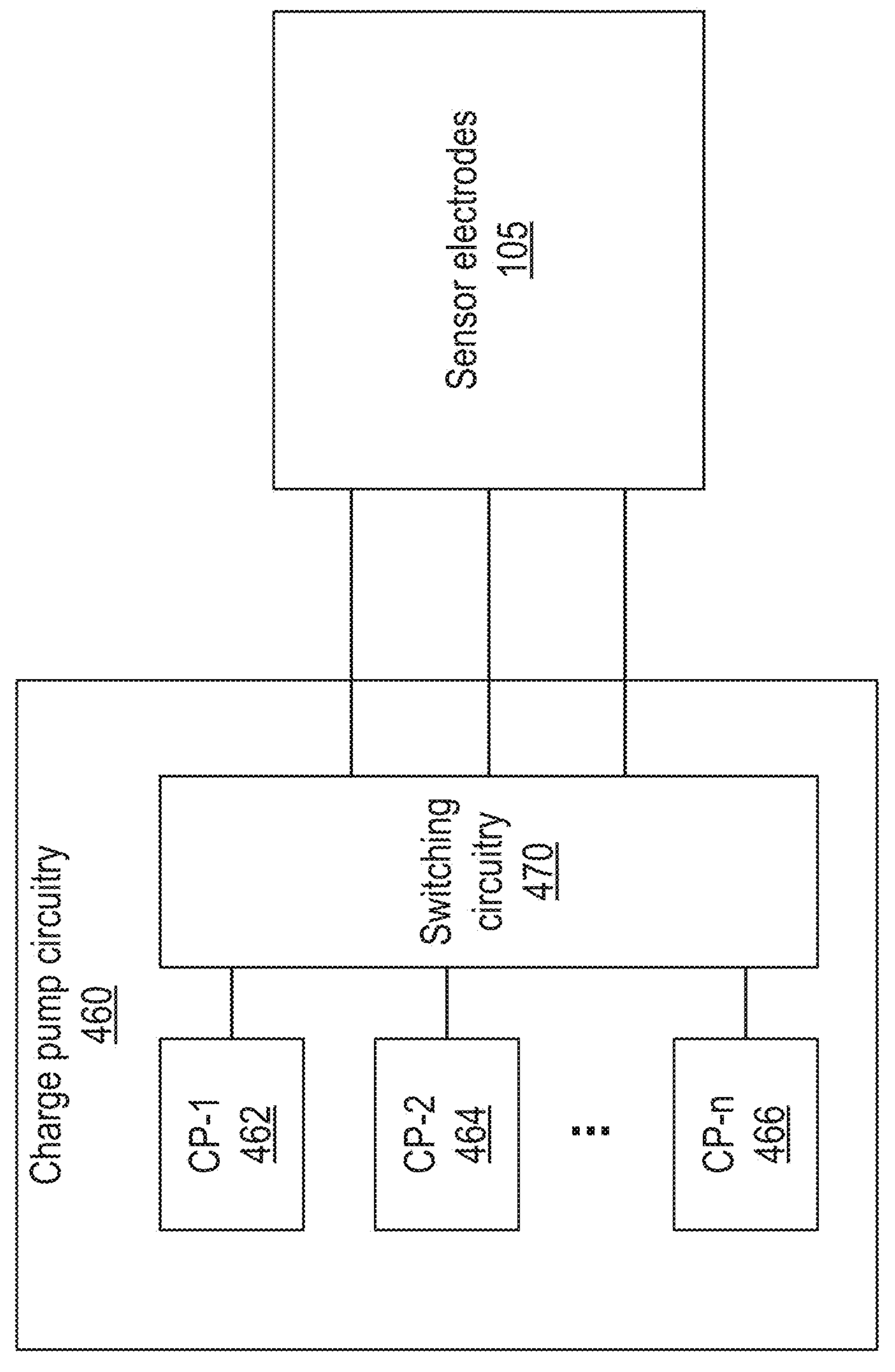
FIG. 4B illustrates charge pump circuitry that operates with sensor electrodes, according to one or more embodiments.

FIG. 4B illustrates charge pump circuitry 460 that operates with sensor electrodes 105, according to one or more embodiments. Similar to the charge pump circuitry 400, the charge pump circuitry 460 may be integrated into the processing system 110 of the input device 100 or may be separate circuit. In one embodiment, the charge pump circuitry 460 is integrated in the sensor circuitry 104 of the processing system 110. For example, the charge pump circuitry 460 may be included in the transmitter circuitry in the sensor circuitry 104. However, it will be understood that the charge pump circuitry 460 may include other suitable components, such as switches, capacitors, resistors, etc.

The charge pump circuitry 460 includes a plurality of charge pumps, such as a first charge pump 462, a second charge pump 464, and an $n^{th}$ charge pump 466 where n is a positive integer.

The plurality of charge pumps in the charge pump circuitry 460 may supply the same or different voltages. For example, the charge pump circuitry 460 may include two "2×" charge pumps (e.g., two first charge pumps 410), two "−1" charge pumps (e.g., two second charge pumps 420), three charge pumps configured to output different supply voltages, three charge pumps configured to output identical or different supply voltages, or any other suitable combinations. The charge pump circuitry 460 may be configured to drive a first group of sensor electrodes 105 using power supplied by the first charge pump 462, a second group of sensor electrodes 105 using power supplied by the second charge pump 464, a third group of sensor electrodes 105 using power supplied by a third charge pump (e.g., $n^{th}$ charge pump 466), and so on. The first, second, third, or additional groups of the sensor electrodes 105 may correspond to different sensor electrodes or different rows and/or columns of sensor electrodes.

In certain embodiments, the charge pump circuitry 460 may be configured to dynamically select one or more groups the sensor electrodes 105 and/or assigning one or more charge pumps to the one or more groups through switching circuits/modules 470. The switching circuits/modules 470 may include multiplexers (MUX), switches, and/or other suitable components.

In at least one embodiment, the charge pump circuitry 400 (or 460) may be configured to drive the sensor electrodes 105 in other modes. For example, the charge pump circuitry 400 may provide a waveform to drive the sensor electrodes 105 to perform mutual capacitance sensing. For example, to achieve high signal-to-noise ratio (SNR) touch sensing, the charge pump circuitry 400 may utilize the first charge pump 410 to generate the 6V voltage supply (e.g., 6V reference voltage 406) and the second charge pump 420 to generate the −3V voltage supply (e.g., −3V reference voltage 408). In mutual capacitance sensing, the rows of the sensor electrodes 105 may be configured to operate as transmitter electrodes, while the columns of the sensor electrodes 105 may be configured to operate as receiver electrodes. The charge pump circuitry 400 can apply the 6V (e.g., 6V reference voltage 406) and the −3V (e.g., −3V reference voltage 408) voltage supplies to the transmitters 430 connected to all rows of the sensor electrodes 105, for example, through switching circuits/modules. In this way, the charge pump circuitry 400 may drive one axis of the panel (approximately half of the full panel capacitance) from −3V to 6V. Similar configuration may be facilitated by configuring two charge pumps in the charge pump circuitry 460.

Figure 5:
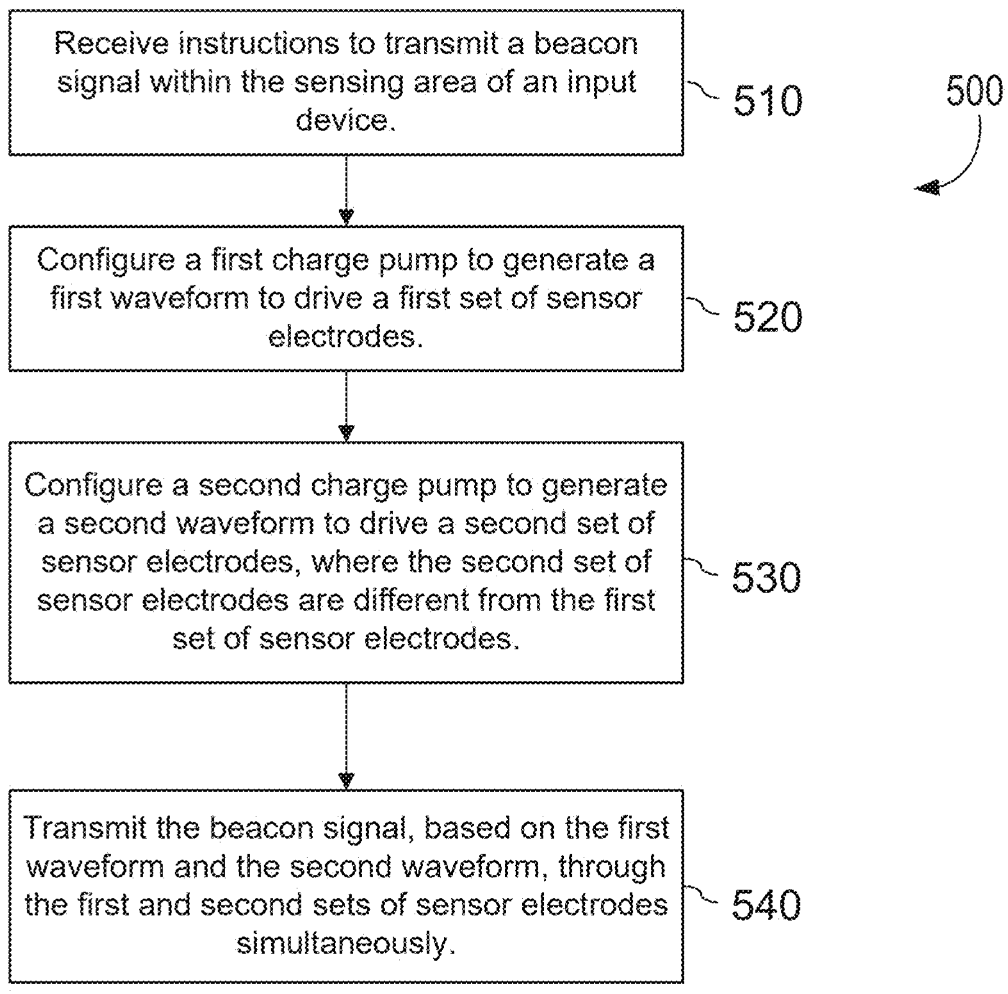
FIG. 5 illustrates a method of operating an input device for touch sensing, in accordance with embodiments described herein.

FIG. 5 illustrates a method 500 of operating an input device 100 for touch sensing, in accordance with embodiments described herein. It will be understood that the method 500 need not be performed in the order shown, and stages may be concurrently or simultaneously performed, except where otherwise apparent.

At step 510, the processing system 110 receives instructions to transmit a beacon signal within the sensing area of the input device 100. The sensing area may correspond to the entire panel or a portion of the sensor electrodes 105. The beacon signal refers to a signal transmitted by the input device 100 through sensor electrodes 105 that are configured to operate as transmitter electrodes. A beacon signal may be predefined as a waveform with an oscillating amplitude (e.g., a peak-to-peak voltage swing) and frequency. In at least one embodiment, the beacon signal may be a waveform that oscillates between two signal references, with varying frequencies. In at least one embodiment, the beacon signal may correspond to multiple synchronized waveforms. These waveforms oscillate at the same frequency(ies) and with the same amplitude. While the absolute values of the signal references can differ, the difference between the signal references for each waveform remains the same. Since the peak-to-peak voltage swings are the same, transmitters (e.g., the transmitters 430 and 440 as shown in FIG. 4A) driving different waveforms will produce the same magnitude response in a receiving system (e.g., an active pen receiver) that is capacitively coupled (e.g., alternating current (AC) coupled) to the transmitters.

At step 520, the processing system 110 configures a first charge pump to generate a first waveform to drive a first set of sensor electrodes.

At step 530, the processing system 110 configures a second charge pump to generate a second waveform to drive a second set of sensor electrodes.

The first and second waveforms are synchronized waveforms corresponding to the beacon signal to be transmitted. The first set of sensor electrodes and the second set of sensor electrodes are subsets of sensor electrodes 105. The first set of sensor electrodes is different from the second set of sensor electrodes. In at least one embodiment, the first and second sets of sensor electrodes, in combination, form the sensing area of the input device 100 for transmitting the beacon signal. For example, the first set of sensor electrodes may include all rows of the sensor electrodes 105 or a subset thereof, while the second set of sensor electrodes may include all columns of the sensor electrodes 105 or subset thereof. Together, the first and second sets of sensor electrodes form the full panel of the sensor electrodes 105.

In at least one embodiment, the processing system 110 may implement the charge pump circuitry 460 and configure more than two groups of sensor electrodes 105 to be driven by multiple charge pumps (e.g., first charge pump (CP-1) 462, second charge pump (CP-2) 464, . . . , $n^{th}$ charge pump (CP-n) 466 as depicted in FIG. 4B) with one or more waveforms.

At step 540, the processing system 110 transmits the beacon signal, based on the first and second waveforms, through the first and second sets of sensor electrodes, which may in certain embodiments be simultaneously transmitted. For example, as shown in FIG. 4A, in the charge pump circuitry 400, the transmitters 430 output the waveform oscillating between 0V and 6V to all rows of sensor electrodes 105, while the transmitters 440 output the waveform oscillating between −3V and 3V to all columns of sensor electrodes 105.

In view of the foregoing, it will be appreciated that exemplary embodiments of the present disclosure enhance the quality of high-frequency signals transmitted by the sensor electrodes in a touch sensing device. This can increase the overall capabilities of the touch sensing device, enabling more robust communication and better performance. In particular, the enhanced signal quality also improves the signal-to-noise ratio (SNR), allowing an active pen to more effectively receive signals from the touch sensing device.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A touch sensor comprising:

a plurality of sensor electrodes configured to transmit a periodic signal corresponding to a first waveform with varying frequencies and a second waveform with varying frequencies; and a sensor circuit comprising:

a first charge pump configured to supply current to a first load comprising a plurality of first sensor electrodes of the plurality of sensor electrodes, the plurality of first sensor electrodes configured to be driven by the first waveform; and a second charge pump configured to supply current to a second load comprising a plurality of second sensor electrodes of the plurality of sensor electrodes, the plurality of second sensor electrodes configured to be driven by the second waveform, wherein the second sensor electrodes are different from the first sensor electrodes.

2. The touch sensor according to claim 1, wherein the sensor circuit further comprises:

one or more first switches configured to connect the first sensor electrodes to the first charge pump; and one or more second switches configured to connect the second sensor electrodes to the second charge pump.

3. The touch sensor according to claim 1, wherein an amplitude of the first waveform varies between a first pair of reference values, wherein an amplitude of the second waveform varies between a second pair of reference values, and wherein the first pair of reference values are different from the second pair of reference values.

4. The touch sensor according to claim 3, wherein the first charge pump is configured to output a first reference value that doubles a source reference value provided as input to the first charge pump, and wherein the second charge pump is configured to output a second reference value that inverts the source reference value provided as input to the second charge pump.

5. The touch sensor according to claim 1, wherein an amplitude of the first waveform varies between a first pair of reference values, wherein an amplitude of the second waveform varies between a second pair of reference values, and wherein the first pair of reference values and the second pair of reference values are identical.

6. The touch sensor according to claim 1, wherein the first sensor electrodes includes all rows of the plurality of sensor electrodes, and the second sensor electrodes includes all columns of the plurality of sensor electrodes.

7. The touch sensor according to claim 1, wherein the sensor circuit further comprises a third charge pump configured to supply current to a third load comprising a plurality of third sensor electrodes of the plurality of sensor electrodes, the plurality of third sensor electrodes configured to be driven by a third waveform, wherein the third waveform is predefined with a same amplitude and frequency as the first and second waveforms.

8. The touch sensor according to claim 7, wherein an amplitude of the first waveform corresponds to a first pair of reference values, an amplitude of the second waveform corresponds to a second pair of reference values, an amplitude of the third waveform corresponds to a third pair of reference values, and wherein the third pair of reference values are identical to the first pair of reference values, the third pair of reference values are different from the second pair of reference values.

9. The touch sensor according to claim 7, wherein an amplitude of the first waveform corresponds to a first pair of reference values, an amplitude of the second waveform corresponds to a second pair of reference values, an amplitude of the third waveform corresponds to a third pair of reference values, and wherein the first, second, and third pairs of reference values are different.

10. The touch sensor according to claim 1, wherein the first waveform and the second waveform are predefined with a same amplitude, and wherein the first waveform and the second waveform are synchronized in frequency.

11. An input device comprising:
- a display; and
- a touch sensor comprising:
  - a plurality of sensor electrodes configured to transmit a periodic signal corresponding to a first waveform with varying frequencies and a second waveform with varying frequencies; and
  - a sensor circuit comprising:
    - a first charge pump configured to supply current to a first load comprising a plurality of first sensor electrodes of the plurality of sensor electrodes, the plurality of first sensor electrodes configured to be driven by the first waveform; and
  - a second charge pump configured to supply current to a second load comprising a plurality of second sensor electrodes of the plurality of sensor electrodes, the plurality of second sensor electrodes configured to be driven by the second waveform, wherein the second sensor electrodes are different from the first sensor electrodes.

12. The input device according to claim 11, wherein the sensor circuit further comprises:
- one or more first switches configured to connect the first sensor electrodes to the first charge pump; and
- one or more second switches configured to connect the second sensor electrodes to the second charge pump.

13. The input device according to claim 11, wherein an amplitude of the first waveform varies between a first pair of reference values, wherein an amplitude of the second waveform varies between a second pair of reference values, and wherein the first pair of reference values are different from the second pair of reference values.

14. The input device according to claim 13, wherein the first charge pump is configured to output a first reference value that doubles a source reference value provided as input to the first charge pump, and wherein the second charge pump is configured to output a second reference value that inverts the source reference value provided as input to the second charge pump.

15. The input device according to claim 11, wherein an amplitude of the first waveform varies between a first pair of reference values, wherein an amplitude of the second waveform varies between a second pair of reference values, and wherein the first pair of reference values and the second pair of reference values are identical.

16. The input device according to claim 11, wherein the first sensor electrodes includes all rows of the plurality of sensor electrodes, and the second sensor electrodes includes all columns of the plurality of sensor electrodes.

17. The input device according to claim 11, wherein the sensor circuit further comprises a third charge pump configured to supply current to a third load comprising a plurality of third sensor electrodes of the plurality of sensor electrodes, the plurality of third sensor electrodes configured to be driven by a third waveform, wherein the third waveform is predefined with a same amplitude and frequency as the first and second waveforms.

18. The input device according to claim 17, wherein an amplitude of the first waveform corresponds to a first pair of reference values, an amplitude of the second waveform corresponds to a second pair of reference values, an amplitude of the third waveform corresponds to a third pair of reference values, and
- wherein the third pair of reference values are identical to the first pair of reference values, the third pair of reference values are different from the second pair of reference values, or wherein the first, second, and third pairs of reference values are different.

19. The input device according to claim 11, wherein the first waveform and the second waveform are predefined with a same amplitude and frequency.

20. A method for transmitting a periodic signal, comprising:
- driving a plurality of sensor electrodes based on a first waveform with varying frequencies and a second waveform with varying frequencies;
- supplying, by a first charge pump, current to a first load comprising a plurality of first sensor electrodes of the plurality of sensor electrodes, the plurality of first sensor electrodes configured to be driven by the first waveform; and
- supplying, by a second charge pump, current to a second load comprising a plurality of second sensor electrodes of the plurality of sensor electrodes, the plurality of second sensor electrodes configured to be driven by the second waveform, wherein the second sensor electrodes are different from the first sensor electrodes.

* * * * *